United States Patent Office 3,301,484
Patented Jan. 31, 1967

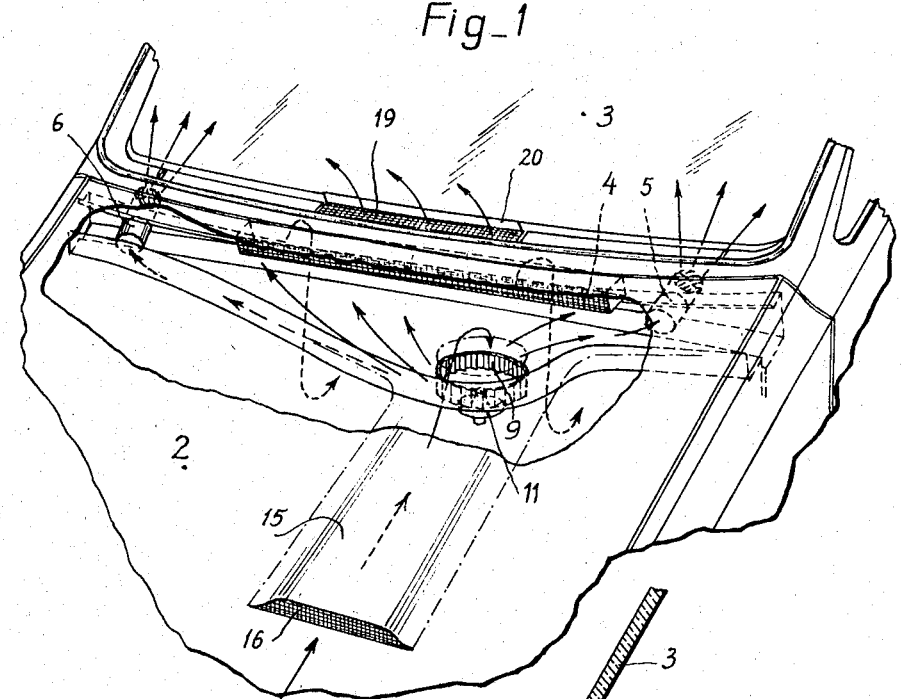
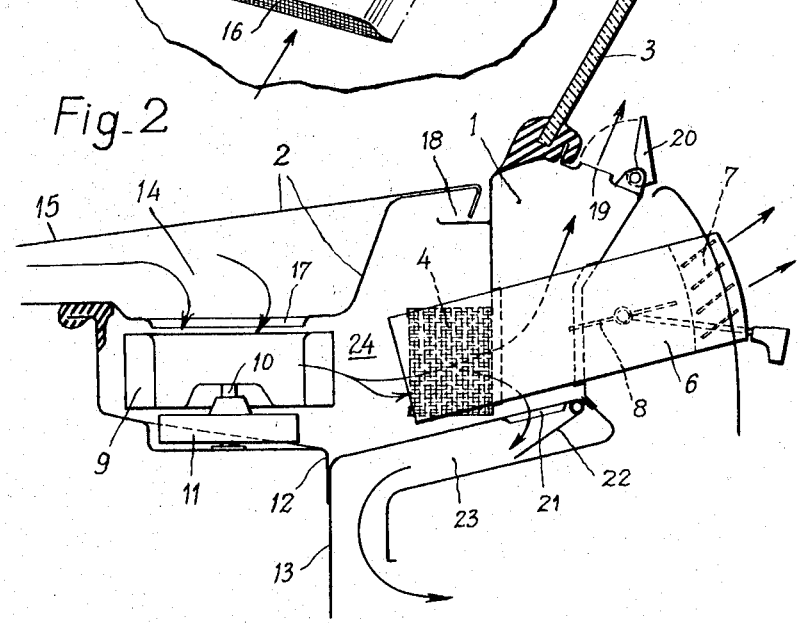

3,301,484
AIR-CONDITIONING OF AUTOMOBILE VEHICLES
Gaëtan de Coye de Castelet, Billancourt, France, assignor to Regie Nationale des Usines Renault, Billancourt, France, a French works
Filed Nov. 30, 1964, Ser. No. 414,772
Claims priority, application France, Dec. 13, 1963, 957,155, Patent 1,387,184
1 Claim. (Cl. 237—34)

The invention relates to the air-conditioning of vehicles and is concerned with improvements made to these air-conditioning systems by virtue of a simple and effective device mounted in a fluid-tight caisson formed by a hollow transverse girder of the chassis arranged in the scuttle of the vehicle in the manner described in the Patent 3,208,368 to Lucien Peras and patent application Serial No. 400,787 of October 1, 1964, for "Air-Conditioning Device for Automobile Vehicles."

The improvements forming the subject of the invention permit obtaining the total supply of air by central lateral ventilators by means of a vertical-shaft fan which draws-in air through an orifice in the bonnet.

In the accompanying drawings:

FIG. 1 is a partial view of the front portion of a vehicle comprising the improvements forming the object of the invention;

FIG. 2 is a section to a larger scale of the front portion and its transverse girder, taken along a plane perpendicular to this girder.

Referring now to the drawings, it can be seen that the hollow girder coupling together the two sides of the chassis-body is indicated at 1, the engine-bonnet at 2 and the windscreen at 3.

The so-called "aerotherm" device or heating radiator through which passes the cooling water of the engine is shown at 4. This radiator of great length is arranged transversely to the chassis and is fixed on the front wall of the hollow girder 1. On each side of this radiator are arranged lateral air-intakes 5 and 6, formed by tubular members carried by the rear wall of the hollow girder and opening into the interior 24 of the girder and into the passenger space with the grid 7 for distributing the air and the regulating shutter 8, as can clearly be seen in FIG. 2.

The ventilation and heating fan 9 has a vertical shaft 10; it is driven by the electric motor 11 and is carried on the partition 12 connected to the wall 13 which is fixed in turn to the girder 1.

The engine bonnet 2 is provided with an internal chamber 14 which is coupled by a cowling conduit 15 to an orifice 16 arranged on the upper face of the bonnet in its central portion. The chamber 14 of the bonnet is provided with an orifice 17 which terminates directly above the fan 9.

The rear extremity of the bonnet, in the closed position, is located very close to the front wall of the hollow girder 1.

A gutter for collecting water is indicated at 18.

At its upper portion, the hollow girder is provided with orifices 19 for de-misting, with a closure-valve 20, one of which is shown open in FIG. 1 and, at its lower portion, with orifices 21 with closure clappers 22, directing the hot air into the conduit or passage 23 and into the passenger space.

The operation of this air-conditioning device is as follows:

When the fan 9 is in operation, the outside air is drawn into the chamber 14 of the bonnet and is delivered by the fan into the hollow girder 1 after passing through the heating radiator 4. This air is distributed towards the windscreen through the orifices 19 for de-misting and towards the passenger space through the orifices 21 for heating and through the lateral tubes 5 and 6 for ventilation. This distribution is effected with cold air or hot air, depending on whether the radiator 4 is open or closed to the intake of the hot water circulating in the engine; the adjustments and regulation are effected by the clapper-valves 8, 20 and 22.

The path of the air is clearly shown by the arrows in the figures.

I claim:

An air-conditioning device for vehicles having a hollow girder located beneath the wind screen, comprising a radiator of great longitudinal length mounted within said hollow girder, a distribution chamber immediately adjacent to and in front of said girder extending substantially along the entire length thereof, a vertical shaft electric suction fan fixedly mounted in said chamber, air intake means in the hood of said vehicle a point remote from the wind screen for taking air in and feeding it to said chamber, a plurality orifice means connecting said chamber to a passenger compartment, at least one of said orifice means spaced from each end of said radiator to feed air directly from said chamber to said compartment by-passing said radiator, further orifice means directing air passing through said radiator towards said windscreen and the vehicle floor respectively, and regulator clapper valve means in each said orifice for controlling the passage of air therethrough.

References Cited by the Examiner
UNITED STATES PATENTS

| | | | |
|---|---|---|---|
| 2,304,643 | 12/1942 | Hans | 98—2.4 |
| 2,316,421 | 4/1943 | Hans | 98—2.4 |
| 2,518,356 | 8/1950 | Mieras et al. | 98—2.4 |
| 2,873,953 | 2/1959 | Thorne | 98—2.4 |
| 3,078,779 | 2/1963 | Wilfert | 98—2.4 |
| 3,208,368 | 9/1965 | Peras | 98—2.4 |

EDWARD J. MICHAEL, Primary Examiner.